United States Patent

Simpson et al.

(10) Patent No.: US 7,632,436 B2
(45) Date of Patent: Dec. 15, 2009

(54) PITCH INFILTRATION OF CARBON FIBER PREFORMS UNDER HIGH PRESSURE

(75) Inventors: Allen H. Simpson, Buchanan, MI (US); Slawomir T. Fryska, Granger, IN (US); Mark L. La Forest, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 371 days.

(21) Appl. No.: 11/455,743

(22) Filed: Jun. 20, 2006

(65) Prior Publication Data

US 2008/0277824 A1 Nov. 13, 2008

Related U.S. Application Data

(60) Provisional application No. 60/692,253, filed on Jun. 21, 2005.

(51) Int. Cl.
*C01B 31/00* (2006.01)
(52) U.S. Cl. ........................... 264/29.6; 264/257
(58) Field of Classification Search ............... 264/29.7, 264/85, 257, 258, 83, 29.1; 156/60, 312
See application file for complete search history.

(56) References Cited

U.S. PATENT DOCUMENTS

| | | | | |
|---|---|---|---|---|
| 4,975,261 A * | 12/1990 | Takabatake | ............. | 423/445 R |
| 5,061,414 A | 10/1991 | Engle | | |
| 6,323,160 B1 * | 11/2001 | Murdie et al. | ............... | 508/109 |
| 6,325,608 B1 * | 12/2001 | Shivakumar et al. | ........ | 264/29.5 |
| 6,350,396 B1 * | 2/2002 | Chellappa | .................. | 264/29.1 |
| 6,537,470 B1 * | 3/2003 | Wood et al. | ................ | 264/29.5 |
| 2004/0105969 A1 | 6/2004 | Huang et al. | | |
| 2004/0155380 A1 * | 8/2004 | Kendall et al. | .............. | 264/257 |
| 2004/0168612 A1 * | 9/2004 | Saver | .......................... | 106/284 |
| 2006/0029804 A1 * | 2/2006 | Klett et al. | .................. | 428/408 |

* cited by examiner

*Primary Examiner*—Kahnh Nguyen
*Assistant Examiner*—Saeed M Huda
(74) *Attorney, Agent, or Firm*—Birch, Stewart, Kolasch & Birch, LLP

(57) ABSTRACT

Process of manufacturing carbon-carbon composite preform by: (i.) arranging batch of carbon fiber preforms in infiltration vessel; (ii.) flooding vessel with hot liquid phase pitch at atmospheric pressure in inert atmosphere; (iii.) raising pressure in infiltration vessel to elevated pressure, and then slowly lowering pressure; and (iv.) repeating step (iii.). An apparatus that may be used is a heated infiltration vessel capable of operating at pressures above 100 psi, possible equipped with means to circulate heated pitch inside the vessel, in order to facilitate heat transfer into the carbon fiber preforms being infiltrated by the pitch. The need for a vacuum pump is eliminated, and the time spent heating the preform is substantially reduced. Instead of vacuum, cycled high pressure is employed to infiltrate carbon fiber preforms with pitch. The use of preheated pitch as a heat transfer agent avoids the slow transfer of heat into the preform prior to infiltration.

7 Claims, No Drawings

PITCH INFILTRATION OF CARBON FIBER PREFORMS UNDER HIGH PRESSURE

This application claims priority to provisional application Ser. No. 60/692,253, filed Jun. 21, 2005. The entire contents of application Ser. No. 60/692,253 are hereby incorporated by reference.

FIELD OF THE INVENTION

This invention relates to the manufacture of carbon-carbon composite materials. More specifically, this invention relates to the production of carbon-carbon composite preforms that are especially useful in the manufacture of aircraft landing system brake discs.

BACKGROUND OF THE INVENTION

Carbon-carbon composites are often formed by laying up woven or nonwoven fabrics or by molding a mixture of loose fiber segments. The fibers in the fabrics and fiber segments are typically derived from pitch, cotton, polyacrylonitrile, or rayon. They are ordinarily joined together by a fusible binder, such as a phenolic resin or furan resin or by needling. The resulting fiber/resin preform is carbonized. That is, the preform is heated to a temperature that drives hydrogen, oxygen, and other elements out of the carbon-skeleton fibers and binders, leaving residual carbon. To reduce voids and increase the density of the carbon-carbon composite preforms, the carbon-carbon composite is infiltrated, e.g. with a phenolic resin or other carbonizable matrix material using a vacuum followed by pressure, and the infiltrated material is then carbonized by heating. Densification is also accomplished by chemical vapor infiltration (CVI) or chemical vapor deposition (CVD). One or more of these chemical infiltration processes is generally repeated three to five times or more before the desired density (at least 1.7 g/cc for friction applications) is achieved. The lengths of time necessary for this heating and infiltration processing is significant. For instance, it may take up to five months to form a carbon-carbon composite brake disc, depending on the number of densification steps used in its preparation.

U.S. Pat. No. 5,061,414 describes a typical method of making a carbon-carbon composite. Mesophase pitch-derived carbon fibers are woven into a cloth, and layers of the cloth are covered with petroleum or coal tar pitch and pressed at a temperature above the softening point of the pitch to form a laminated composite. The composite is restrained in a suitable fixture and heated to carbonize the pitch binder. The carbonized composite is then impregnated several times with pitch by covering the composite with hot pitch under pressure. The composites are heat-treated between each impregnation step to crack up the infiltrated carbon and allow additional pitch to enter the microstructure during the next impregnation cycle. The impregnated composites are then given a final heat treatment in the range 2500-3000° C. to fully graphitize the fibers and the matrix carbon. The composites are then infiltrated with pyrolytic carbon by CVD processing at 1000-1300° C. for 150 hours.

US 2004/0105969 A1 discloses that a mixture of carbon-containing fibers and a suitable matrix material is compressed while resistively heating the mixture to form a carbonized composite material having a density of at least 1.30 g/cc. This composite is formed in less than 10 minutes, which is said to be significantly shorter than conventional processes taking several days and achieving lower density material. Following impregnation of this composite, final densities of 1.6-1.8 g/cc are said to be readily achievable with one or two infiltration cycles, using a pitch or other carbonaceous material to fill voids in the composite, and rebaking.

U.S. Pat. No. 6,537,470 B1 describes break-through technology in which a resin transfer molding process is used to rapidly fill fibrous preforms with high viscosity resin or pitch.

Typically, pitch infiltration of carbon fiber preforms takes 8-10 hours and requires a vacuum pump. In such processing, the carbon fiber preforms are normally heated under vacuum.

SUMMARY OF THE INVENTION

The present invention eliminates the need for a vacuum pump and substantially reduces the time spent heating the preform. The present invention provides up to 400% increased throughput in an infiltration system. Instead of vacuum, the present invention employs cycled high pressure to infiltrate carbon fiber preforms with pitch. This invention uses preheated pitch as a heat transfer agent to avoid the slow transfer of heat into the preform prior to infiltration.

An apparatus that is especially useful in the present invention is a heated infiltration vessel that is capable of operating at pressures above 100 psi. Advantageously, the infiltration vessel is equipped with means to circulate heated pitch inside the vessel, in order to facilitate heat transfer into the carbon fiber preforms being infiltrated by the pitch.

DETAILED DESCRIPTION OF THE INVENTION

The process of this invention may be carried out by proceeding in accordance with the following four primary processing modules.

(1.) Reheating pitch in a holding tank. The tank is kept hot and pitch is added as needed so that hot liquid pitch is continuously supplied to the infiltration vessel.

(2.) Arranging carbon fiber preforms in the infiltration vessel, and flushing the vessel with nitrogen.

(3.) Flooding the infiltration vessel with hot liquid phase pitch at atmospheric pressure under nitrogen. Heat may be applied to the walls of the vessel to maintain the pitch at the desired temperature. The pitch may be circulated from the infiltration vessel to the melt tank, wherein additional heat may be imparted to the pitch, and then back into the infiltration vessel, in order to speed heating of the preforms.

(4.) During the processing described in (3.), cycling the pressure in the infiltration vessel from atmospheric pressure (about 15 psi) to a pressure of 100 psi or more. The pressure may be increased at any rate, but is lowered slowly, typically at a rate of 20 psi per minute or less. The pressure can be permitted to drop to approximately atmospheric pressure. However, it need not go all the way back to atmospheric pressure as long as some substantial lowering of pressure is accomplished. The limiting factor in lowering the pressure is the ability of the preform to hold together during the pressure release process. This depends on the materials and the architecture of the preform.

After cycling the pressure from atmospheric to elevated and back again about 3 to 7 times, the excess pitch is drained from the infiltration vessel, and the preforms are removed from the infiltration vessel. Fewer than 3 or more than 7 repetitions can be employed, depending upon economic considerations.

There is no need to cool the infiltration vessel at the end of the processing described in (4.). In fact, additional preforms may be placed into the vessel at this point for pitch infiltration processing as described above. The process of this invention can reduce the time required to infiltrate a batch of preforms from about 10 hours per batch to less than 2 hours per batch.

After infiltration is complete the preform is carbonized, may be optionally heat treated, and may then be further infiltrated to increase the density of the preform.

EXAMPLE

A 3 inch diameter piece of a non-woven carbonized preform 1.57 inches thick is cut from a Boeing 777 aircraft brake preform made by Honeywell International. The sample is placed into a pressure vessel and heated to 320° Celsius. The pressure vessel is flushed with nitrogen to remove all air from the pressure chamber. The vessel at atmospheric pressure is flooded with molten coal tar pitch having a softening point of 180° Celsius. The pressure is increased to 75 psi and held for twelve minutes. Pressure is then slowly released at the rate of 5 psi per minute until the vessel is at atmospheric pressure. The pressurization and depressurization cycle is repeated two more times with the sample immersed in pitch. The vessel is then opened and the sample is removed and place into a carbonization furnace. The sample is carbonized to 900° Celsius and subsequently heat treated to 1400° Celsius. The sample is then ground 0.050 inches on all sides, and the mass and dimensions measured. The density is calculated to be 1.04 grams/cc.

The sample is again subjected to the same heating, pressure, pitch infiltration, and carbonization scenarios. The sample is then ground 0.020 inches on all sides. The part is then measured and weighed. Subsequently, the density is calculated and found to be 1.27 grams/cc.

The sample is subjected to the same heating, pressure, pitch infiltration, and carbonization scenarios for a third time. The sample is again ground 0.020 inches on all sides. After these processes are completed, the sample is found to have a density of 1.47 grams/cc.

The present invention has been described herein in terms of preferred embodiments. However, obvious modifications and additions to the invention will become apparent to those skilled in the relevant arts upon a reading and understanding of the foregoing description. It is intended that all such modifications and additions form a part of the present invention to the extent that they fall within the scope of the several claims appended hereto.

What is claimed is:

1. A process of manufacturing a carbon-carbon composite preform, which process comprises the steps of:
   (i.) arranging a batch of carbon fiber preforms in an infiltration vessel;
   (ii.) flooding the vessel with hot liquid phase pitch at atmospheric pressure in an inert atmosphere by providing a continuously heated holding tank for the pitch, maintaining a continuous supply of heated pitch therein, and continuously supplying heated pitch to the infiltration vessel,
   wherein the pitch is circulated from the infiltration vessel to a melt tank where additional heat is imparted to the pitch and the pitch is then circulated back into the infiltration vessel in order to speed heating of the preforms;
   (iii.) raising the pressure in the infiltration vessel from atmospheric pressure to an elevated pressure of at least 100 psi, and then lowering the pressure at a rate of 20 psi per minute or less;
   (iv.) repeating step (iii.) from 3 to 7 times.

2. The process of claim 1, wherein step (i.) includes flushing the vessel with nitrogen.

3. The process of claim 1, wherein in step (ii.) the infiltration vessel is flooded with hot liquid phase pitch at atmospheric pressure under nitrogen.

4. The process of claim 1, wherein in step (ii.) heat is applied to the walls of the vessel to maintain the pitch at the desired temperature.

5. A process of manufacturing a carbon-carbon composite preform, which process comprises the steps of:
   placing a non-woven carbonized preform into a pressure vessel and heating the vessel and preform to 320° Celsius;
   flushing the pressure vessel with nitrogen to remove air from a pressure chamber;
   flooding the vessel, at atmospheric pressure, with molten coal tar pitch having a softening point of 180° C.;
   increasing the pressure in the pressure vessel to 75 psi and holding that pressure for 12 minutes to effect infiltration of said preform by said pitch;
   releasing the pressure at a rate of 5 psi per minute until the vessel is at atmospheric pressure;
   repeating the pressurization and depressurization cycle two additional times, with the preform immersed in the molten coal tar pitch; and
   placing the preform into a carbonization furnace, carbonizing the preform to 900° C., and finally heat treating the preform at 1400° C.

6. The process of claim 5, wherein the heat-treated preform produced by the process is ground 0.050 inches on all sides, and then is again subjected to the recited pitch infiltration, pressurization/depressurization, carbonization, and heat treatment procedures again.

7. The process of claim 6, wherein the heat-treated preform produced by the process is ground 0.020 inches on all sides, and then is again subjected to the recited pitch infiltration, pressurization/depressurization, carbonization, and heat treatment procedures for a third time.

* * * * *

UNITED STATES PATENT AND TRADEMARK OFFICE
CERTIFICATE OF CORRECTION

PATENT NO. : 7,632,436 B2  Page 1 of 1
APPLICATION NO. : 11/455743
DATED : December 15, 2009
INVENTOR(S) : Simpson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 549 days.

Signed and Sealed this

Second Day of November, 2010

David J. Kappos
*Director of the United States Patent and Trademark Office*